United States Patent
Paulino

(10) Patent No.: US 8,432,048 B1
(45) Date of Patent: Apr. 30, 2013

(54) HYBRID ENGINE WITH A GAS TURBINE ENGINE

(75) Inventor: Jose R Paulino, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 304 days.

(21) Appl. No.: 13/042,676

(22) Filed: Mar. 8, 2011

(51) Int. Cl.
*B60K 1/00* (2006.01)

(52) U.S. Cl.
USPC .......................................... 290/1 A

(58) Field of Classification Search .................... 290/1 A
See application file for complete search history.

(56) References Cited

U.S. PATENT DOCUMENTS

| | | | |
|---|---|---|---|
| 3,703,146 A * | 11/1972 | Kovats | 105/61.5 |
| 3,813,557 A * | 5/1974 | Traeger | 290/2 |
| 3,970,163 A * | 7/1976 | Kinoshita | 180/65.26 |
| 4,843,816 A * | 7/1989 | Kronogard et al. | 60/39.183 |
| 5,819,524 A * | 10/1998 | Bosley et al. | 60/39.465 |
| 6,418,707 B1 * | 7/2002 | Paul | 60/784 |

FOREIGN PATENT DOCUMENTS

| | | | |
|---|---|---|---|
| GB | 2466081 A * | 6/2010 | |
| JP | 2003328772 A * | 11/2003 | |
| WO | WO 9919161 A1 * | 4/1999 | |

* cited by examiner

*Primary Examiner* — Joseph Waks
(74) *Attorney, Agent, or Firm* — John Ryznic

(57) ABSTRACT

A hybrid power plant with a gas turbine engine that produces a hot gas flow that is passed through a power turbine to drive an output shaft. A second compressor and second combustor is driven by an electric motor to produce a second hot gas flow that is passed through the power turbine to drive the output shaft. at a cruise speed, only the gas turbine engine is operated to supply hot gas to the power turbine. At low speed or idle, only the second compressor and second combustor is used to produce a hot gas flow for the power turbine. At maximum power, both the gas turbine engine and the second compressor and combustor produces hot gas for the power turbine.

2 Claims, 1 Drawing Sheet

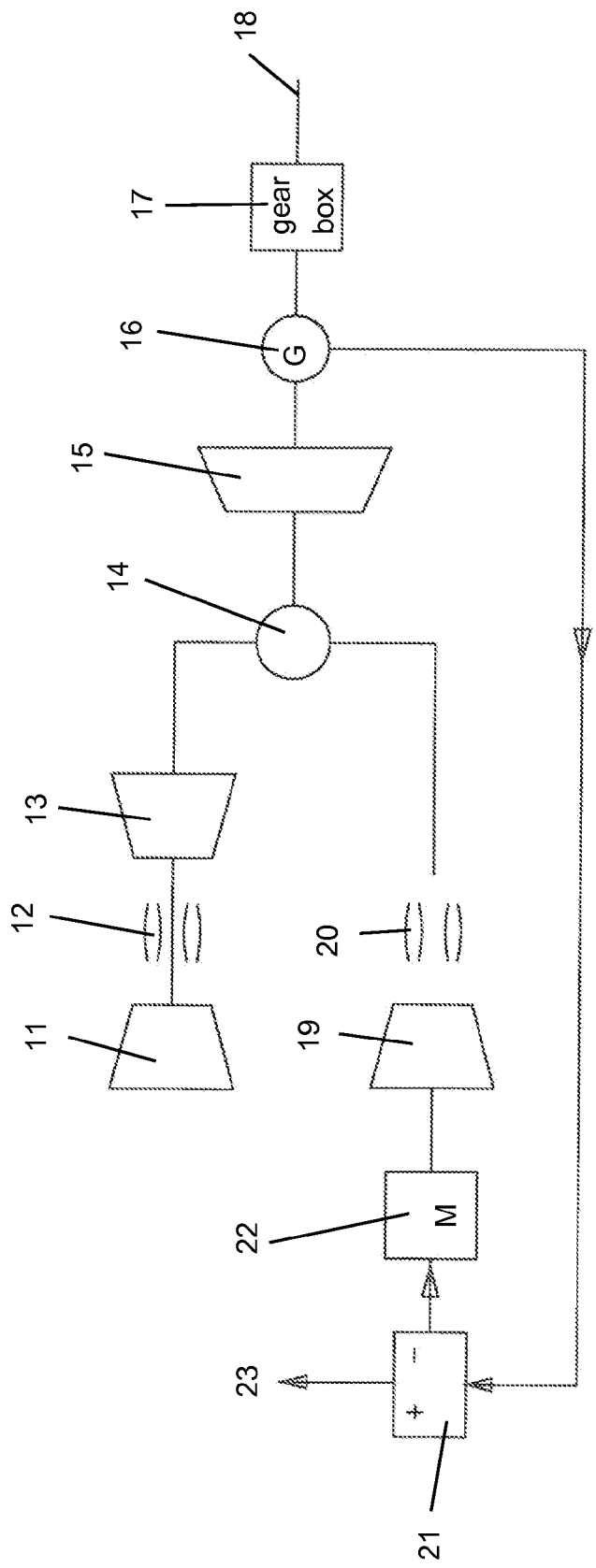

HYBRID ENGINE WITH A GAS TURBINE ENGINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a power plant for a vehicle, and more specifically to a hybrid power plant with a gas turbine engine.

2. Description of the Related Art Including Information Disclosed Under 37 CFR 1.97 and 1.98

Heavy vehicles, such as an eighteen wheeler tractor trailer, use a large diesel engine to drive the vehicle because Diesel engines have higher efficiency than a gasoline engine. A vehicle that operates a cruise speed for long periods of time in relation to idle speed or stop-and-go speeds such as a taxi is experienced to needs to have a high efficiency. In the past, engine designers have considered replacing the Diesel engine with a gas turbine engine because both engines have similar efficiencies. However, the gas turbine power output lag is considered unacceptable in the automotive industry.

Another problem with replacing a Diesel engine with a gas turbine engine is that the gas turbine engine is very efficient at its design speed of operation, but very inefficient at low speeds such as that which would operate at idle or lower speeds.

BRIEF SUMMARY OF THE INVENTION

A hybrid power plant with a gas turbine engine that discharges a hot exhaust into a power turbine to drive an output shaft for a cruise speed, and an electric battery that supplies electrical energy to an electric motor that drives a compressor to compress air that is delivered to a combustor to burn with a fuel and produce a hot gas stream that is passed through the power turbine to also drive the output shaft. During low speeds, the gas turbine engine is not operated while the electric compressor and combustor are operated to supply the hot gas to the power turbine. During cruise or design speed, the gas turbine engine is operated while the electric compressor and combustor are not operated. During a short duration high power output requirement, both the gas turbine engine and the compressor and combustor produce hot gas for the power turbine.

The power turbine also drives an electric generator to resupply the battery that drives the compressor. A gear box is located between the power turbine and the output drive shaft to reduce the rotational speed.

BRIEF DESCRIPTION OF THE SEVERAL VIEWS OF THE DRAWINGS

The FIGURE shows a cross section view of the hybrid power plant of the present invention.

DETAILED DESCRIPTION OF THE INVENTION

The hybrid power plant of the present invention is shown in the FIGURE and includes a gas turbine engine with a compressor 11, a combustor 12 and a turbine 13. The turbine exhaust is passed into a manifold 14 that collects the hot gas flow from both the turbine 13 and a combustor 20 described below. Hot gas within the manifold is passed through a power turbine 15 to drive an output shaft 18 for a vehicle or a boat. The power turbine shaft is connected to an electric generator 16 to produce electrical energy. A gear box 17 is connected between the power turbine output shaft and the drive shaft or output shaft 18 of the vehicle or boat.

A second source of heat for the power turbine includes a compressor 19 driven by an electric motor 22 that supplies compressed air to a combustor 20 to burn a fuel and produce a hot gas flow that is passed into the manifold 14 and then through the power turbine 15. An electric battery 21 provides the power for the electric motor 22 that drives the compressor 19 or to vehicle accessories 23 that requires electrical power. The electric generator 16 driven by the power turbine 15 charges the battery 21.

During a cruise speed, only the gas turbine engine is operated and supplies the required hot gas flow to the power turbine 15 through the manifold 14. The gas turbine engine is sized for the particular vehicle or boat being powered for the most efficient fuel consumption based on the weight and cruise speed requirements.

During idle speeds or low speed, the gas turbine engine is not operated and the electric motor drives the compressor 19 to supply compressed air to the combustor 20. A fuel is burned in the combustor to produce a hot gas flow that is then passed into the manifold 14 and then through the power turbine 15 to drive the output shaft 18.

When a maximum power is required, both the gas turbine engine and the compressor and combustor 20 are operated together to produce hot gas flows that are both supplied to the manifold 14 and then into the power turbine 15. The electric generator 16 is operated when the battery requires charging and is primarily driven when the gas turbine engine is in operation.

I claim the following:

1. A hybrid power plant comprising:
   a gas turbine engine with a first compressor, a first combustor and a turbine to produce a first hot gas flow;
   a second compressor driven by an electric motor to produce a compressed air and a second combustor to receive the compressed air to burn with a fuel and produce a second hot gas flow;
   a manifold to receive the first and second hot gas flows;
   a power turbine to receive the hot gas flow from the manifold and drive an output shaft;
   a battery connected to the electric motor to supply electrical energy and drive the electric motor; and,
   an electric generator driven by the power turbine and connected to the battery to charge the battery.

2. The hybrid power plant of claim 1, and further comprising:
   the second combustor is connected directly to the manifold without a turbine.

* * * * *